April 17, 1962  D. A. REEVES  3,029,520
INDICATING DEVICE
Filed Dec. 18, 1956
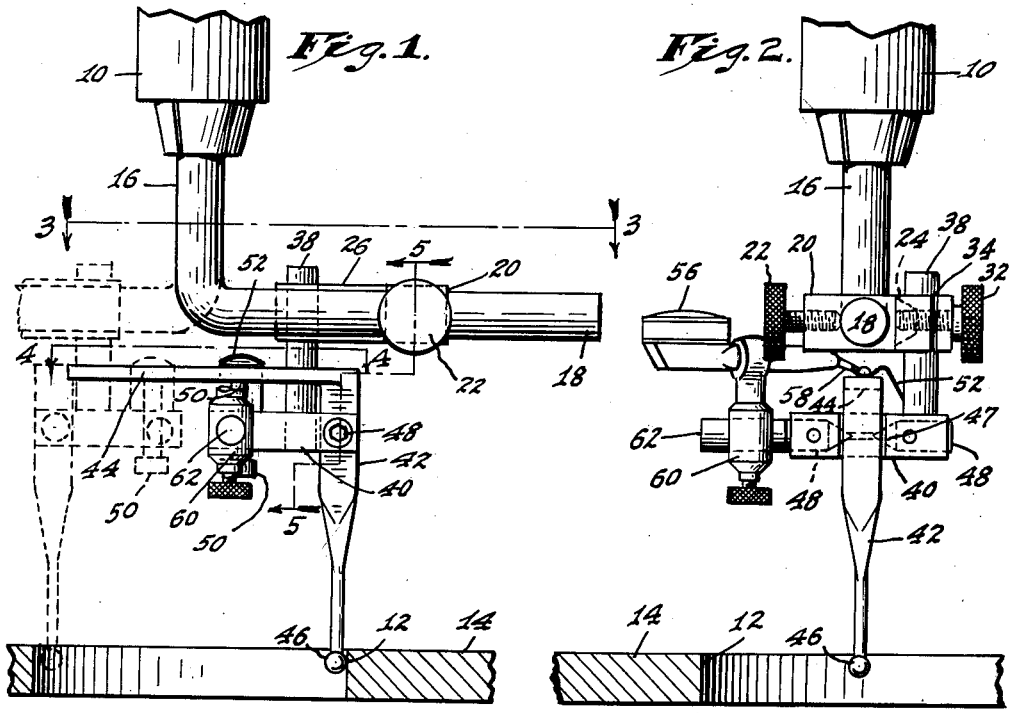
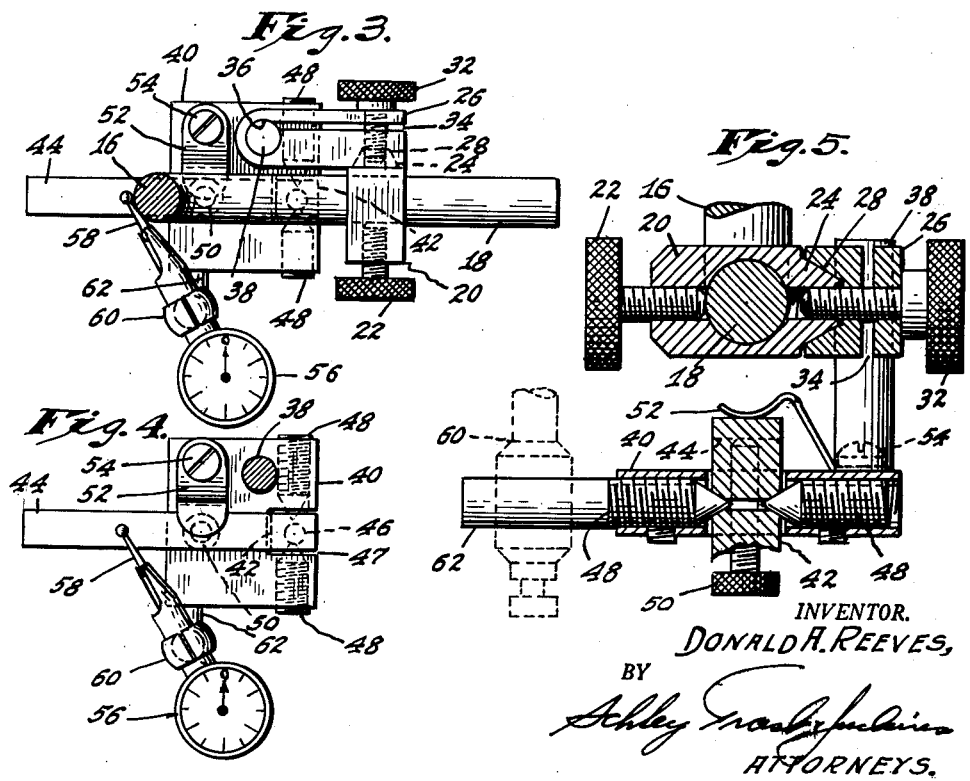
INVENTOR.
DONALD A. REEVES,
BY
ATTORNEYS.

United States Patent Office 3,029,520
Patented Apr. 17, 1962

3,029,520
INDICATING DEVICE
Donald A. Reeves, Indianapolis, Ind.
(P.O. Box 103, Plainfield, Ind.)
Filed Dec. 18, 1956, Ser. No. 629,060
4 Claims. (Cl. 33—172)

This invention relates to an indicating device, and more particularly to a device for indicating the axis of a boring.

Many metal parts, after being formed to their desired shape, have their walls bored to provide a plurality of holes. These holes are generally displaced in a fixed relationship over an entire wall surface.

In effecting a set-up on a machine cutting tool to produce these multiple borings, a first boring is made and then measurements for all subsequent borings are calculated from the axis of that first boring. It is now common practice to determine the axis of that first boring by rotating a gauge along the walls of said boring by the driving mechanism of a machine cutting tool. Such a gauging device has inherent defects, in that it is generally quite expensive and its use is limited to borings having a relatively narrow range of diameters. Moreover, during one-half of its revolution around said boring, the dial face on said gauge is not within view of the operator, thereby making said gauge difficult to read and increasing the chances for erroneous gauge readings.

It is the general object of my invention to provide an inexpensive compact indicating device for effecting rapid set-ups in machine cutting tools. More specifically, it is an object of my invention to provide an easily readable indicating device which can be read during the entire gauging operation, and which is operable on borings having a wide range of diameters. It is an object of my invention to provide an indicating device having a high degree of sensitivity, and which is adapted for use with any standard type of measuring gauge.

In accordance with my invention there is provided a main shaft forming a supporting arm for a slide which carries my indicating device into alignment to the walls of said boring. A carrier platform is adjustably suspended from said slide and forms a mounting for a bell crank feeler arm engageable with the work face of the boring to be gauged. Preferably, said feeler arm having a work-engaging spindle and a rocker arm bar is pivotally mounted on said carrier platform.

A dial gauge is conveniently mounted on the carrier platform. Said gauge is positioned with its actuating lever engaging said bell crank feeler arm, and having its dial face carried in a plane parallel to the carrier platform. This positioning permits the dial of said gauge to be in constant view of the operator during the entire rotation of said device in the boring being gauged.

The accompanying drawing illustrates my invention. In such drawing:

FIG. 1 is a side elevation of an indicating device embodying my invention;

FIG. 2 is an end elevation of the device shown in FIG. 1;

FIG. 3 is a horizontal section taken on the line 3—3 of FIG. 1;

FIG. 4 is a horizontal section taken on the line 4—4 of FIG. 1; and

FIG. 5 is an enlarged vertical section taken on the line 5—5 of FIG. 1.

As shown in FIG. 1, my indicating device is adapted for aligning a machine cutting tool chuck 10 with the axis of a boring 12 in a work piece 14.

Conveniently, my device is held in a work-position by a main supporting member having an arm 16 received in the chuck 10 and a second arm 18 extending radially outward from the arm 16. The arm 18 forms a support for carrying the device around the circumference of the boring being gauged when the arm 16 is driven by the chuck 10.

A slide 20 is received on the arm 18 and is movable thereon to bring the indicator into contact with the side walls of the boring 12. By moving the slide 20 outwardly along the arm 18, borings having radii substantially as long as the length of said arm may be gauged. Desirably, one side of said slide is tapped to receive a securing screw 22 which binds against the arm 18 for holding said slide in the proper displacement along the arm 18.

The opposite side of the slide 20 is milled to form a frustoconical boss 24 having a circular side face and an end face. A split-bar 26 having a corresponding frustoconical recess 28 is received on the boss 24. An adjusting screw 32 extending through the bar 26 and received in a tapped opening in the end boss 24 holds the bar recess 28 and said boss in intimate contact.

As shown in FIG. 3, the split-bar 26 is provided with an elongated slot 34 terminating in an aperture 36, which receives a platform-holding rod 38. The lower end of the rod 38 is fixedly secured to a carrier platform 40 parallel to the slide 20 and movable with respect to said slide. As the screw 32 is loosened, the slot 34 spreads increasing the diameter of the aperture 36 and loosening the bind on the rod 38, thereby permitting said rod and the carrier platform 40 to be moved in a plane normal to the plane of movement of the slide 20. The split-bar 26 also permits the platform 40 to be angularly adjusted with respect to the slide 20 and the chuck 10. By loosening the adjusting screw 32, the split-bar 26 may be rotated about the frustroconical boss 24 on the slide 20 for adjusting the angular position of the platform, and the components carried thereby, with respect to the slide 20 and the chuck 10. After the platform is positioned in the desired angle, the adjusting screw 32 is tightened to hold said platform at the desired angle. This adjustment permits my device to gauge a work surface disposed at an angle to the chuck 10. Further, by moving the slide 20 to the outer end of the arm 18, and then tilting the platform with respect to said slide, the sensing element on my device will be disposed outwardly beyond the end of the arm 18 to permit the gauging of openings having radii greater than the length of the arm 18.

As shown in FIG. 1, the work is engaged by a bell crank feeler arm having a work-engaging spindle 42 and a rocker bar 44 normal thereto. Desirably, the shank of the spindle 42 is tapered toward its lower end to reduce the strength and rigidity of the spindle. Thus, when said spindle strikes any gross obstruction in the face of the boring being gauged, it will not fracture or force any other structural component out of alignment. Rather, said spindle will bend due to its decreased rigidity, and may be easily bent back into alignment. A spherical rider 46 is disposed at the end of the spindle 42 to provide a smooth riding surface for engaging the boring walls. Desirably, said rider is formed of hardened steel to withstand the strains of constant wear and abrasion during the gauging operations.

One side of the carrier platform 40 is recessed, as at 47, to receive the bell crank feeler arm. Said arm is pivotally mounted on the platform by means of a pair of screws 48 extending laterally inward from the side of the platform 40. The ends of the screws 48 are tapered to form conical bearing surfaces which extend a small distance into the recess 47. The sides of the spindle 42 are provided with corresponding conical shaped recesses adapted to fit over the tapered ends of the screws 48. Such a pivotal construction reduces the amount of lateral wobble, thereby decreasing the bind on the spindle 42, and allowing it to make a free swing during its longitudinal pivotal movement.

The limit of the radially outward movement of the spindle 42 is controlled by a limit screw 50 directed upwardly through the platform 40 and bearing against the lower face of the rocker arm bar 44. Tension is maintained on the feeler arm by means of a leaf spring 52 engaging the top face of the rocker bar 44 to oppose its upward movement, and bias it toward the limit screw 50. Said spring may be secured to the platform 40 by a screw 54, or any other convenient securing means.

As shown in FIG. 2, any standard type of indicating dial gauge 56 may be used with my device. Said gauge is mounted on a binding post 60 slidably received on a supporting rod 62 extending outwardly from the platform 40.

Conveniently, the gauge 56 is secured adjacent the rearward edge of the platform 40, so that its actuating lever 58 is disposed toward the terminal end of the rocker bar 44.

By positioning the gauge 56 in a fixed position above the platform 40 with its dial face parallel to said platform, its dial face is presented upwardly during the entire revolution of the indicator around the boring 12, so that the operator can at all times make a reading on the dial face. This positions the gauge actuating arm 58 is contact with the rocker bar 44 near the point of maximum movement of said rocker bar, thereby permitting said gauge to indicate any variations in the boring wall surfaces that cause only a slight movement of the bar 44.

In using my device, as for example on a jig bore, the shaft arm 16 is secured in the chuck 10. The slide 20 is moved along the arm 18 until the rider 46 is radially displaced from the chuck axis a distance slightly greater than the radius of the boring to be gauged, thus moving the arm 44 upward. After the slide is properly displaced, it is held in a fixed position by tightening the screw 22 and the gauge 56 is zeroed. By adjustment of the chuck and the platform-holding rod 38, the rider is brought into the proper alignment and contact with the boring wall.

The jig bore is then actuated to rotate the chuck, moving the entire indicating device in a like manner, with the rider 46 moving along the boring wall. As the rotation proceeds, the spindle 42 is pivoted radially inward producing a movement of the rocker bar 44, the degree of pivotal movement being a function of the degree of alignment between the axis of the chuck and boring. Action of the spring 52 on the rocker bar 44 constantly urges the spindle and rider radially outward into contact with the boring walls.

Pivotal movement of the spindle 42 and rocker bar 44 produces corresponding deflections in the dial gauge actuating lever 58. These deflections are transmitted to the gauge dial to indicate plus or minus increments of alignment between said chuck and the boring. By moving the work piece in the proper direction, the deflections are reduced to zero and the axes of the chuck and boring are thus in exact alignment.

Due to the positioning of the gauge 56 on my device the dial face is in view of the operator at any point in the travel of the rider along the circumference of the boring. This permits the operator to readily see and correct any misalignment at any point along the boring circumference so that the chuck 10 is exactly centered over the boring 12.

I claim as my invention:

1. In combination with a measuring gauge for determining linear movement, an indicating device for aligning a rotatable spindle with a work piece, comprising an L-shaped main supporting member mountable on said spindle for rotating the device therewith, a slide adjustably mounted on said member for adjusting the radial and angular position of said slide with respect to the axis of rotation of said spindle, a planar carrier platform carried by said slide and movable therewith, mounting means on said platform supporting said gauge thereon to dispose its dial face in a plane parallel to the plane of said platform and in a single fixed plane of rotation throughout the rotation of the spindle, and a bell crank feeler arm pivotally mounted on said platform, said arm including a first member generally normal to said platform and projecting substantially therebeyond for engagement with the work piece and a second member generally parallel with said platform and engageable with said measuring gauge for measuring the throw of said arm, said carrier platform being adjustably movable with respect to the slide for adjusting the distance and angular displacement between the feeler arm and the slide.

2. In combination with a measuring gauge for determining linear movement, an indicating device for aligning a rotatable spindle with respect to a work piece, comprising a main supporting member having a pair of arms normal to each other, one of said arms being mountable on said spindle for rotating the device therewith, a slide adjustably mounted on the other of said pair of arms on said member for bringing said device into alignment with the work piece, means for releasably holding said slide in a fixed position on said other of said supporting arms, a planar carrier platform carried by said slide and movable therewith, mounting means on said platform supporting said gauge thereon to dispose its dial face in a plane parallel to the plane of the platform and in a single fixed plane of rotation throughout the rotation of the spindle, a bell crank feeler arm mounted on said platform, said arm being engageable with the work piece and said measuring gauge for measuring the throw of said arm, and adjusting means interconnecting said platform and slide for adjusting the angular position of the platform with respect to the slide and for adjusting the relative distance between the slide and platform to dispose the feeler arm at the desired spaced, angular position with respect to the slide and the axis of rotation of the supporting member.

3. An indicating device for aligning a rotatable spindle with respect to a work piece, comprising an L-shaped supporting member for supporting said indicating device in a work position in a spindle for rotation therewith about said work piece, a planar carrier platform, adjustable means interconnecting said platform to said supporting member for rotation of said platform therewith and for adjusting the radial, angular, and axial displacement of said platform with respect to the axis of said spindle, a bell crank feeler arm pivotally mounted on said platform and engageable with a work piece, a measuring gauge mounted on said platform and having an actuating lever engageable with said bell crank feeler arm whereby said gauge will determine the amount of pivotal movement of said feeler arm, said gauge having its dial face disposed in a single plane of rotation parallel to the plane of said platform throughout said rotation, biasing means acting in a plane normal to the plane of the platform and urging said feeler arm in a direction away from said actuating lever and toward engagement with said work piece, and means on said platform for holding said feeler arm in engagement with said biasing means and limiting the outward movement of said arm.

4. An indicating device for aligning a rotatable spindle with respect to a work piece, comprising an L-shaped supporting member supporting said device in a work position in said spindle for rotation therewith about said work piece, a planar carrier platform operatively carried by the supporting member and adjustably movable with respect to said supporting member to adjust the angular and radial positioning of said platform with respect to the axis of rotation of said spindle, a bell crank feeler arm pivotally mounted on said platform, said feeler arm having a work-engaging spindle normal to the platform and extending therebeyond and a rocker bar normal to said work-engaging spindle for transmitting movements of the former to a linear movement measuring gauge mounted on said platform with its dial face disposed in a plane parallel to the plane of said platform, and means on said platform for adjustably positioning the feeler arm in operative engagement with the gauge and work piece.

References Cited in the file of this patent

UNITED STATES PATENTS

| | | |
|---|---|---|
| 1,391,731 | Genung | Sept. 27, 1921 |
| 2,098,838 | Rusnak | Nov. 9, 1937 |
| 2,115,955 | Johnson | May 3, 1938 |
| 2,242,151 | Sisson | May 13, 1941 |
| 2,267,583 | Carroll | Dec. 23, 1941 |
| 2,483,743 | Turrettini | Oct. 4, 1949 |
| 2,576,142 | Rinaldy | Nov. 27, 1951 |
| 2,849,799 | Muller | Sept. 2, 1958 |

FOREIGN PATENTS

| | | |
|---|---|---|
| 605,692 | Great Britain | July 28, 1948 |